(12) United States Patent
Galindo Perez et al.

(10) Patent No.: US 9,291,528 B2
(45) Date of Patent: Mar. 22, 2016

(54) DOMESTIC APPLIANCE DEVICE

(75) Inventors: Juan Jose Galindo Perez, Zaragoza (ES); Maria Lourdes Grande Mainar, Zaragoza (ES); Enrique Javier Perez Visa, Zaragoza (ES)

(73) Assignee: BSH Hausgeraete GmbH, Munich (DE)

(*) Notice: Subject to any disclaimer, the term of this patent is extended or adjusted under 35 U.S.C. 154(b) by 330 days.

(21) Appl. No.: 13/825,828

(22) PCT Filed: Sep. 29, 2011

(86) PCT No.: PCT/IB2011/054279
§ 371 (c)(1),
(2), (4) Date: Mar. 25, 2013

(87) PCT Pub. No.: WO2012/046165
PCT Pub. Date: Apr. 12, 2012

(65) Prior Publication Data
US 2013/0186210 A1    Jul. 25, 2013

(30) Foreign Application Priority Data
Oct. 8, 2010    (ES) .................................. P201031494

(51) Int. Cl.
| | |
|---|---|
| *H02J 3/00* | (2006.01) |
| *G01M 99/00* | (2011.01) |
| *A47L 15/00* | (2006.01) |
| *D06F 39/00* | (2006.01) |
| *F24C 7/08* | (2006.01) |
| *H02J 3/14* | (2006.01) |

(52) U.S. Cl.
CPC .......... *G01M 99/005* (2013.01); *A47L 15/0047* (2013.01); *D06F 39/005* (2013.01); *F24C 7/082* (2013.01); *A47L 2401/06* (2013.01); *A47L 2401/30* (2013.01); *A47L 2501/26* (2013.01); *A47L 2501/32* (2013.01); *H02J 2003/146* (2013.01); *Y02B 70/3266* (2013.01); *Y04S 20/242* (2013.01)

(58) Field of Classification Search
CPC ............ A47L 15/4293; A47L 15/0047; A47L 2301/00; A47L 2501/26; D06F 2216/00; D06F 33/02; F24C 7/082; F24C 7/087; F24C 7/08; F24C 7/085; H02J 2003/143; H02J 13/001
See application file for complete search history.

(56) References Cited

U.S. PATENT DOCUMENTS 4,858,141 A * 8/1989 Hart et al. ................. 702/61
5,111,027 A * 5/1992 Fowler ..................... 219/506
(Continued)

FOREIGN PATENT DOCUMENTS

DE        3932170 A1     4/1991

OTHER PUBLICATIONS

International Search Report PCT/IB2011/054279 dated Aug. 21, 2012.

*Primary Examiner* — David A Rogers
(74) *Attorney, Agent, or Firm* — James E. Howard; Andre Pallapies

(57) ABSTRACT

A domestic appliance device includes an evaluating unit for evaluating the consumption of at least one external resource by a domestic appliance, and an output unit for outputting the evaluated consumption. In order to provide a generic domestic appliance device having increased ease of use, the evaluating unit evaluates the consumption of the external resource while taking into consideration at least one variable evaluating parameter.

29 Claims, 4 Drawing Sheets

(56) References Cited

U.S. PATENT DOCUMENTS

| | | | |
|---|---|---|---|
| 5,459,303 A * | 10/1995 | Kwon | 219/705 |
| 5,568,765 A * | 10/1996 | Andoh et al. | 99/403 |
| 5,635,895 A | 6/1997 | Murr | |
| 6,169,964 B1 * | 1/2001 | Aisa et al. | 702/136 |
| 6,633,823 B2 * | 10/2003 | Bartone et al. | 702/57 |
| 6,734,806 B1 * | 5/2004 | Cratsley, III | G06Q 50/06 340/870.09 |
| 7,043,380 B2 * | 5/2006 | Rodenberg et al. | 702/62 |
| 7,246,395 B2 * | 7/2007 | Buckroyd et al. | 8/158 |
| 7,561,977 B2 * | 7/2009 | Horst et al. | 702/62 |
| 7,705,484 B2 * | 4/2010 | Horst | 307/35 |
| 8,007,597 B2 * | 8/2011 | Beaudet et al. | 134/18 |
| 8,027,752 B2 * | 9/2011 | Castaldo et al. | 700/296 |
| 8,463,453 B2 * | 6/2013 | Parsons, Jr. | 700/295 |
| 8,818,566 B2 * | 8/2014 | Besore et al. | 700/295 |
| 2002/0040505 A1 * | 4/2002 | Tanaka et al. | 8/158 |
| 2003/0177776 A1 | 9/2003 | Ghent et al. | |
| 2004/0189462 A1 * | 9/2004 | Eilers et al. | 340/531 |
| 2006/0070612 A1 * | 4/2006 | Horton et al. | 126/19 R |
| 2006/0231551 A1 * | 10/2006 | Ruther et al. | 219/707 |
| 2006/0271214 A1 * | 11/2006 | Brown | 700/90 |
| 2008/0053441 A1 * | 3/2008 | Gottlib et al. | 128/204.23 |
| 2008/0143489 A1 * | 6/2008 | Castaldo et al. | 340/286.01 |
| 2008/0185451 A1 * | 8/2008 | Simon et al. | 236/51 |
| 2008/0272934 A1 * | 11/2008 | Wang et al. | 340/870.11 |
| 2009/0045804 A1 * | 2/2009 | Durling et al. | 324/140 R |
| 2009/0113638 A1 * | 5/2009 | Kim et al. | 8/158 |
| 2010/0031460 A1 * | 2/2010 | Eisermann et al. | 15/104.33 |
| 2010/0070434 A1 * | 3/2010 | Cooper | G06Q 50/06 705/412 |
| 2010/0117625 A1 * | 5/2010 | Botts | G01R 22/10 324/103 R |
| 2010/0146712 A1 * | 6/2010 | Finch et al. | 8/137 |
| 2011/0072378 A1 * | 3/2011 | Nurminen et al. | 715/771 |
| 2011/0109472 A1 * | 5/2011 | Spirakis | G06Q 10/06 340/870.02 |
| 2011/0112780 A1 * | 5/2011 | Moss | G01D 4/002 702/62 |
| 2011/0119515 A1 * | 5/2011 | Sadwick et al. | 713/340 |
| 2011/0148199 A1 * | 6/2011 | Besore et al. | 307/41 |
| 2011/0153101 A1 * | 6/2011 | Thomas | G06Q 10/04 700/291 |
| 2011/0283216 A1 * | 11/2011 | Buyuktopcu | 715/771 |
| 2012/0011031 A1 * | 1/2012 | Lewis et al. | 705/27.1 |
| 2012/0056827 A1 * | 3/2012 | Kim et al. | 345/173 |
| 2012/0065797 A1 * | 3/2012 | Brian et al. | 700/295 |
| 2012/0068854 A1 * | 3/2012 | Shiflet et al. | 340/870.02 |
| 2012/0166233 A1 * | 6/2012 | Wengrovitz et al. | 705/7.11 |
| 2012/0316687 A1 * | 12/2012 | Chen | H02J 3/008 700/276 |
| 2012/0330442 A1 * | 12/2012 | Hwang et al. | 700/90 |
| 2013/0135116 A1 * | 5/2013 | Garbe | G08C 19/00 340/870.02 |

\* cited by examiner

DOMESTIC APPLIANCE DEVICE

BACKGROUND OF THE INVENTION

The invention relates to a domestic appliance device.

The publication DE 39 32 170 A1 discloses a domestic appliance device having an evaluating unit and a display unit, with the evaluating unit evaluating an energy consumption of a domestic appliance and outputting said energy consumption on the display unit.

The publication EP 0 844 326 B1 discloses a washing machine having a domestic appliance device with an evaluating unit and a display unit, with the display unit evaluating an energy and water consumption of the washing machine and outputting said energy and water consumption on the display unit.

BRIEF SUMMARY OF THE INVENTION

The object of the invention consists in particular in providing a generic domestic appliance device having an increased ease of use.

The invention relates to a domestic appliance device having an evaluating unit that evaluates a consumption of at least one external resource by a domestic appliance, and an output unit for outputting the evaluated consumption.

It is proposed that the evaluating unit be provided to evaluate consumption of the external resource while taking into consideration at least one variable evaluation parameter. "Provided" is understood to be, in particular, specially designed and/or equipped and/or programmed. An "evaluating unit" is understood to be, in particular, a unit which includes an arithmetic unit and, preferably, differing from the arithmetic unit, a memory unit in which, particularly advantageously, an evaluating program is stored. Preferably, the evaluating unit has at least one measuring unit for measuring the consumption of the external resource. "External resource" is understood to be in particular at least one resource supplied from outside and necessary for the operation of the domestic appliance, such as in particular energy and/or a fluid. "Consumption of an external resource" is understood to be in particular a quantity of the external resource and/or a quantity of the external resource divided by a value that is proportional to a time interval. Preferably, the consumption is an accumulated total consumption, in particular during an operating program of the domestic appliance, and/or an instantaneous consumption of the domestic appliance and/or an expected consumption for execution of an operating program of the domestic appliance. An "output unit" is understood to be in particular a unit which outputs a value in a visual and/or audible and/or tactile and/or electronic manner. Preferably, the output unit includes a display unit, in particular an LCD display, and/or a communications interface that outputs the value electronically. Advantageously, the communications interface makes the value available in the form of an electronic coding so that it is electronically readable, in particular by an arithmetic unit and preferably for further processing by the arithmetic unit. An "evaluation parameter" is understood to be in particular a parameter that is used by the evaluating unit during a determination and, in particular, during a calculation of the consumption of the external resource. In particular, the evaluation parameter is a conversion factor, preferably for conversion of a measured consumption of the external resource. It is especially advantageous if the evaluating unit calculates the consumption of the external resource by means of stored and, in particular, non-variable consumption values. A "variable evaluation parameter" is understood to be in particular an evaluation parameter which, after delivery of the domestic appliance to an end user, can be changed and/or can be entered, in particular by the end user and/or in an automated manner, and which in particular can also assume different values dependent upon at least one further parameter, in particular a time and/or a user or a user group. In particular, the variable evaluation parameter differs from a fixed evaluation parameter which in particular is specified by physical laws and/or by conversion factors between two units of measurement. Preferably, the variable evaluation parameter is a business management parameter, in particular costs per unit of the external resource, preferably in any currency, and/or as a percentage of an available budget. Preferably, the unit of measurement of the variable evaluation parameter consists of a quotient of two units of measurement, in particular Euros/kWh, Euros/liter or Euros/$m^3$. That the evaluating unit "evaluates the consumption of the external resource while taking into consideration a variable evaluation parameter" is understood to mean in particular that the evaluating unit uses the variable evaluation parameter during determination of the consumption of the external resource and preferably transmits the consumption of the external resource to the output unit in a unit of measurement which corresponds to a counter of the quotient of the unit of measurement of the variable evaluation parameter.

An advantageously increased ease of use can be achieved by such an embodiment, since the consumption of the domestic appliance is transparent to a user. In particular, a user can display the consumption of the external resource in a unit that is easily understandable to said user, in particular, costs. The increased transparency can have an educational effect and as a result lead to a more economical use of the external resource. Energy efficiency can be increased in this way.

Advantageously, the external resource is energy and in particular electrical energy. Advantageously the external resource is a fluid. A "fluid" is understood to be in particular a substance which follows any slow shear without resistance and has in particular a finite viscosity. Preferably, the fluid is a liquid, in particular water or a liquid containing water. Preferably, the fluid is a gas and preferably a combustible gas, in particular methane, ethane, propane, butane or ethylene, or a combustible gaseous mixture, in particular consisting of the gases methane, ethane, propane, butane and/or ethylene.

Furthermore, it is proposed that the evaluating unit includes at least one memory unit. A "memory unit" is understood to be in particular an electronic unit for storing data. Preferably, the memory unit includes a semi-permanent memory, in particular an EEPROM (Electrically Erasable Programmable Read-only Memory) and/or a Flash EEPROM. This can enable storage of various data, in particular the variable evaluation parameter and/or a history of the consumption of the external resource, which can advantageously increase ease of use.

In a preferred embodiment it is proposed that the evaluating unit stores at least one variable evaluation parameter in the memory unit. This can advantageously increase ease of use since, when the domestic appliance is restarted, repeated inputting of the variable evaluation parameter can be dispensed with. Preferably, the evaluating unit stores a plurality of variable evaluation parameters in the memory unit in accordance with a further parameter, in particular different variable evaluation parameters for different times, in particular times of day, and/or for different users and/or user groups. The storage of different variable evaluation parameters for different times can ensure that during the evaluation of the consumption of the external resource, the evaluating unit can take account of a time-related change in the variable evaluation parameter. The storage of different evaluation parameters for different users and/or user groups enables an individual user profile to be created.

In a particularly preferred embodiment of the invention it is proposed that the domestic appliance device has an input unit for inputting at least one variable evaluation parameter. An "input unit" is understood to be in particular an operator control unit for inputting and/or modifying the variable evaluation parameter by a user. Preferably, the input unit is intended for a manual input, in particular by means of operator control elements provided for this purpose. This allows modification and/or inputting of the variable evaluation parameter by a user.

In a further embodiment of the invention, it is proposed that the domestic appliance device includes a communications unit which establishes at least one variable evaluation parameter. A "communications unit" is understood to be in particular a unit that differs from an input unit, which communicates with other devices, in particular an arithmetic unit differing from the evaluating unit, and/or an electricity meter, in particular via cable and preferably wirelessly. That the communications unit "establishes at least one variable evaluation parameter", is understood to mean in particular that the communications unit obtains the variable evaluation parameter from another device, in particular from an arithmetic unit differing from the evaluating unit, preferably a computer connected to the Internet, and/or from an electricity meter and preferably stores it in the memory unit. Automated updating of the variable evaluation parameter can be achieved in this way.

Furthermore, it is proposed that the evaluating unit blocks operation of the domestic appliance in accordance with at least one variable evaluating parameter. That the evaluating unit "blocks operation of the domestic in accordance with at least one evaluation parameter" is understood to mean in particular that the evaluating unit blocks operation and preferably automated operation of the domestic appliance if a condition dependent upon the variable evaluation parameter, which is preferably specified by a user, is violated. The condition is preferably characterized by a limiting value of the variable evaluation parameter. The condition is preferably one where the value falls below or exceeds the limiting value of the variable evaluation parameter. It is particularly advantageous if the condition is a minimization of costs of the external resource during automated operation of the domestic appliance, in particular a cooking program or a washing program. This enables intelligent control of the domestic appliance to be achieved. Moreover, the domestic appliance device can automatically contribute to a cost reduction.

In a further embodiment of the invention it is proposed that the evaluating unit stores in the memory unit an accumulated consumption in each case in accordance with at least two grouping parameters. An "accumulated consumption" is understood to be in particular an overall consumption accumulated over a specific time interval. A "grouping parameter" is understood to be in particular a parameter to which an accumulated consumption is assigned. The grouping parameter is preferably a user or a user group and/or a time period. This can simplify the billing of accrued operating costs in the case of a shared-use domestic appliance, in particular in a shared apartment and/or where occupants change.

In a particularly preferred embodiment of the invention it is proposed that, during a selection of a sequence program, the evaluating unit evaluates the expected consumption of the external resource while taking into consideration at least one variable evaluation parameter. A "sequence program" is understood to be in particular a stored program and one that is run automatically at a specified time, in particular a cooking program or a washing program. The domestic appliance preferably enables the user to store a dedicated sequence program, in particular a dedicated cooking program. "Selection of a sequence program" is understood to be in particular an operator control routine by a user in which the user preselects a sequence program in a first step and selects it in a second step. The sequence program preselected in the first step and selected in the second step then starts at a time specified by the user and is preferably influenced by the evaluating unit. The sequence program preferably starts at the earliest after an enabling signal by the evaluating unit. "During a selection of a sequence program, the evaluating unit evaluates the expected consumption of the external resource while taking into consideration at least one variable evaluation parameter", is understood to mean in particular that during or immediately after preselecting a sequence program in the first step, the evaluating unit determines the expected consumption of the external resource while the sequence program just preselected is running, while taking into consideration the variable evaluation parameter and relays it to the output unit for outputting. Here "immediately after" is understood to be in particular a time period of not more than 5 s, in particular a maximum of 4 s, advantageously not more than 2 s and particularly advantageously a maximum of 1 s. The expected consumption is preferably stated in a unit of measurement which corresponds to the numerator of the quotient of the unit of measurement of the variable evaluation parameter. Preferably, the consumption of the external resource for each sequence program is stored in the memory unit at least after an initial run of the sequence program. The total consumption of the external resource for each sequence program is preferably determined and stored in the memory unit after a first run of the sequence program. Due to such an embodiment, information concerning the expected consumption of the domestic appliance can be displayed in a form that is transparent to the user. This can enable education and/or encouragement of the user in the preselection of economical sequence programs.

Furthermore, it is proposed that the evaluating unit be designed, at least partially, as a one-piece integral part of a control unit of the domestic appliance. "At least partially as a one-piece integral part" is understood to mean in particular that components, in particular an arithmetic unit and/or a memory unit and/or an output unit, are used together. A "control unit of the domestic appliance" is understood to be in particular an electronic unit and preferably an electronic arithmetic unit, which is provided at least for control and/or regulation of at least one function of the domestic appliance. In addition, the control unit preferably takes over, at least partially, tasks of the evaluating unit. This can save installation space and reduce costs.

Furthermore, it is proposed that the output unit be designed, at least partially, as a one-piece integral part of an operational status output unit of the domestic appliance. An "operational status output unit" is understood to be in particular an output unit which outputs an operational status of the domestic appliance. In addition, the operational status output unit preferably takes over, at least partially, tasks of the output unit. The operational status output unit is preferably an operational status display unit, in particular an LCD display. This can save installation space and reduce costs.

Furthermore, a method is proposed for evaluating a consumption of at least one external resource by a domestic appliance having an inventive domestic appliance device with an output unit for outputting the evaluated consumption, in which the consumption of the external resource is evaluated while taking into consideration at least one variable evaluation parameter. Ease of use can be advantageously increased by such a method, since the consumption of the external resource can be displayed to the user in a transparent manner.

Further advantages are revealed in the following descriptions of the drawings. An exemplary embodiment of the invention is represented in the drawings. The drawings, the descriptions and the claims include numerous features in combination. The person skilled in the art will also usefully consider the features individually and combine them in further meaningful combinations.

DETAILED DESCRIPTION OF EXEMPLARY EMBODIMENTS OF THE PRESENT INVENTION

Figure 1:
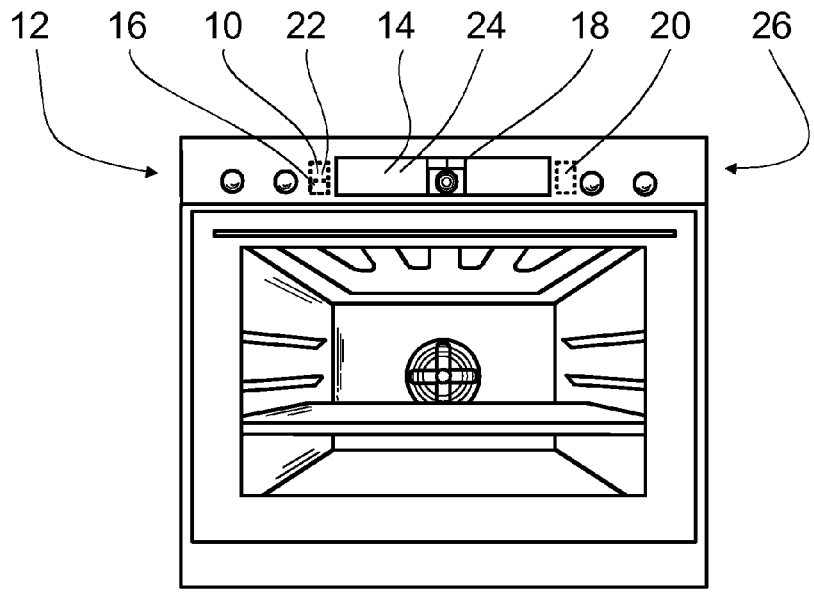
FIG. 1 shows a top view of an oven with an inventive domestic appliance device.
Figure 2:
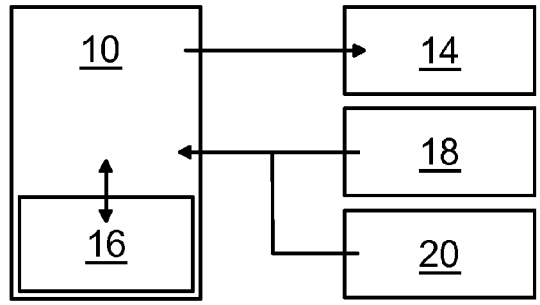
FIG. 2 shows a block diagram of the domestic appliance device with an evaluating unit and an output unit.

FIG. 1 shows a domestic appliance 12 realized as an oven 26, with an inventive domestic appliance device. The domestic appliance device includes an evaluating unit 10 which evaluates an energy consumption of the domestic appliance 12 in kWh, and an output unit 14 for outputting the evaluated consumption. Moreover, the evaluating unit 10 is specially provided to evaluate the energy consumption while taking into consideration at least one variable evaluation parameter. In the present case, the variable evaluation parameter concerns costs in Euros per kWh of electrical energy. The evaluating unit 10 is therefore able to convert the energy consumption of the domestic appliance 12 into energy costs in Euros. The domestic appliance device includes an input unit 18 which inputs the costs in Euros per kWh of electrical energy. The evaluating unit 10 includes a memory unit 16 and stores the costs in Euros per kWh of electrical energy in the memory unit 16. Furthermore, at the end of a cooking process, the evaluating unit 10 stores a cooking time and accumulated energy consumption in kWh for the cooking process in the memory unit 16. The evaluating unit 10 is realized as a one-piece unit integral part of a control unit 22 of the domestic appliance 12. The output unit 14 includes a display unit and is realized as a one-piece integral part of an operational status output unit 24 of the domestic appliance 12. Alternately or additional to the input unit 18, the domestic appliance device can include a communications unit 20, which determines electronically the costs in Euros per kWh of electrical energy, in particular at different times of day, in particular via an Internet connection from an energy exchange and/or from an electricity meter. FIG. 2 shows a schematic block diagram of the components of the domestic appliance device.

Figure 3:
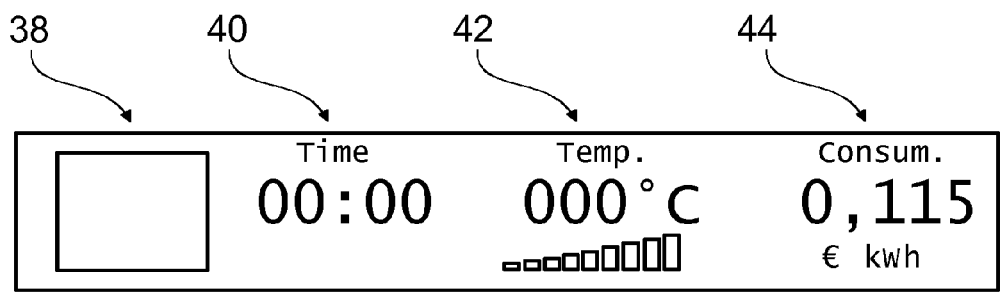
FIG. 3 shows a display of the output unit during an input of a variable evaluation parameter.

FIG. 3 shows a display of the display unit of the output unit 14. The display is divided into four information areas: an operational display area 38, a time display area 40, a temperature display area 42 and a consumption display area 44. The operational display area 38 informs a user of a current operational status of the domestic appliance 12. The time display area 40 numerically displays a current clock time, an elapsed cooking time or a cooking time of a sequence program. The temperature display area 42 numerically displays a setpoint temperature and symbolically displays an actual temperature in the form of a bar chart. The consumption display area 44 displays an instantaneous power draw of the domestic appliance 12 in kW, an accumulated or expected energy consumption of the domestic appliance 12 in kWh or accumulated or expected energy costs in Euros. FIG. 3 shows the display of the display unit of the output unit 14 shortly after the costs in Euros per kWh of electrical energy have been input. The operational display area 38, the time display area 40 and the temperature display area 42 show zeros without an information content. On the other hand, the consumption display area 44 shows the costs in Euros per kWh of electrical energy. In the present case, the costs in Euros per kWh of electrical energy amount to 0.115 Euros/kWh.

Figure 4:
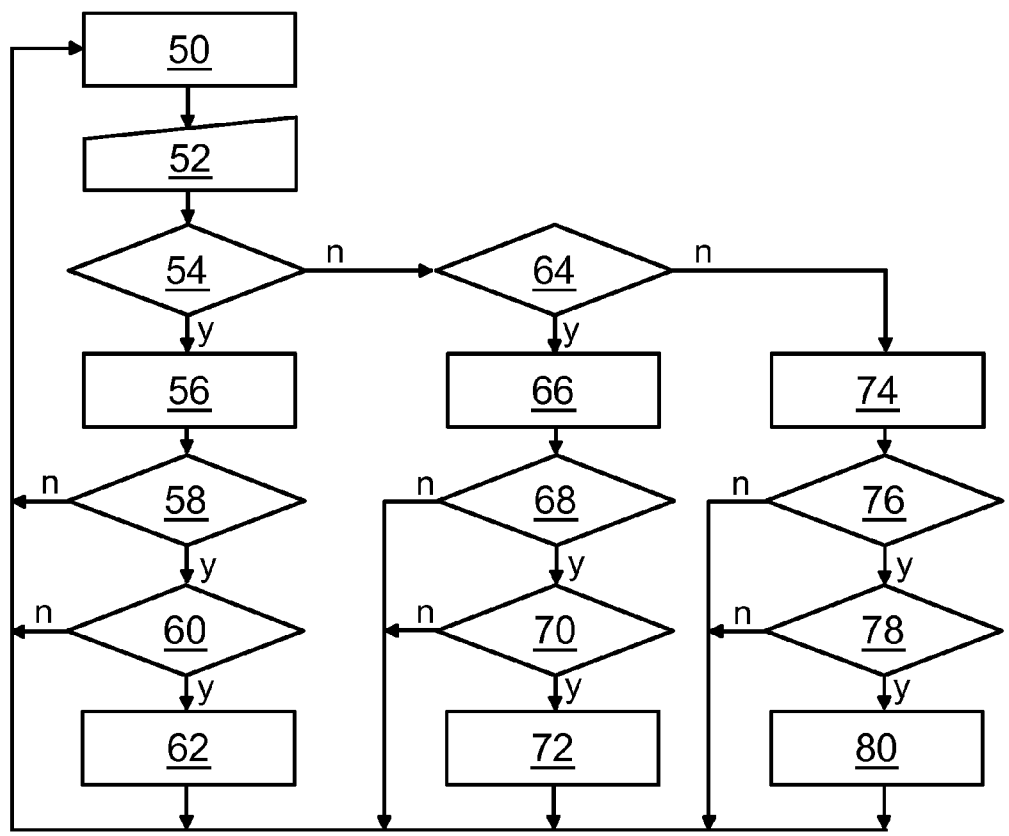
FIG. 4 shows a flow chart of a determination of an information content of a display of the output unit.

The evaluating unit 10 translates a method for evaluating a consumption of at least one external resource by a domestic appliance 12 having an inventive domestic appliance device with an output unit 14 for outputting the evaluated consumption, with the consumption of the external resource being evaluated while taking into consideration a variable evaluation parameter. In the present case, the variable evaluation parameter concerns costs in Euros per kWh of electrical energy. An information content of the display of the display unit of the output unit 14 is determined by the evaluating unit 10 by way of the flow chart in FIG. 4.

Figure 5A:
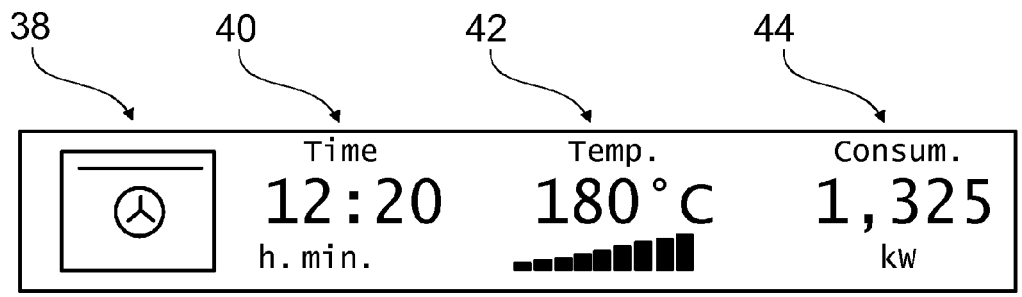
FIG. 5a shows the display of the output unit during a cooking process, with a displayed instantaneous power and a clock time.
Figure 6A:
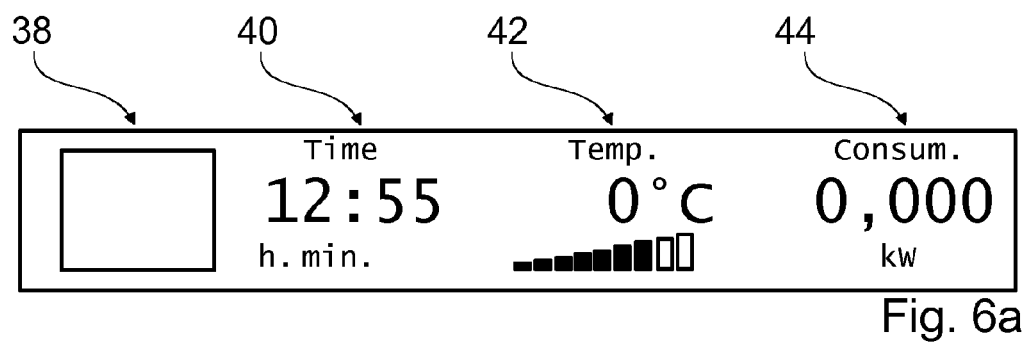
FIG. 6a shows the display of the output unit at the end of the cooking process, with a displayed instantaneous power in kW and a clock time.

In a step 50, which represents an initial display state, an instantaneous power draw of the oven 26 is calculated by the evaluating unit 10 by means of tabular values for the heating units of the oven 26 just in operation. The instantaneous power draw of the oven 26, along with a current clock time, an operational status of the domestic appliance 12 and a setpoint temperature and an actual temperature, are transmitted to the output unit 14. FIG. 5a shows a possible display of the display unit of the output unit 14 during a cooking process. The operational display area 38 indicates an operation with recirculated air and top heat. The time display area 40 indicates a current clock time. The temperature display area 42 indicates a setpoint temperature of 180° C. as well as an existing actual temperature by means of the bar chart. The consumption display area 44 indicates an updated power draw of 1.325 kW. FIG. 6a shows a possible display of the display unit of the output unit 14 following a cooking process. The operational display area 38 indicates that the domestic appliance 12 is switched off. The time display area 40 indicates a current clock time. The temperature display area 42 indicates a setpoint temperature of 0° C. as well as an existing actual temperature by means of the bar chart. The consumption display area 44 indicates an updated power draw of 0 kW. As can be seen from the bar chart in the temperature display area 42, the oven 26 still has residual heat from a previous cooking process.

Figure 5B:
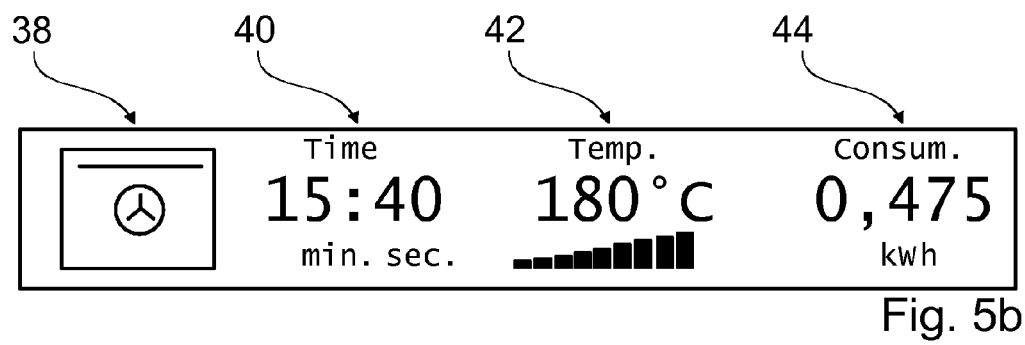
FIG. 5b shows the display of the output unit during a cooking process, with a displayed accumulated consumption in kWh and a cooking time.
Figure 5C:
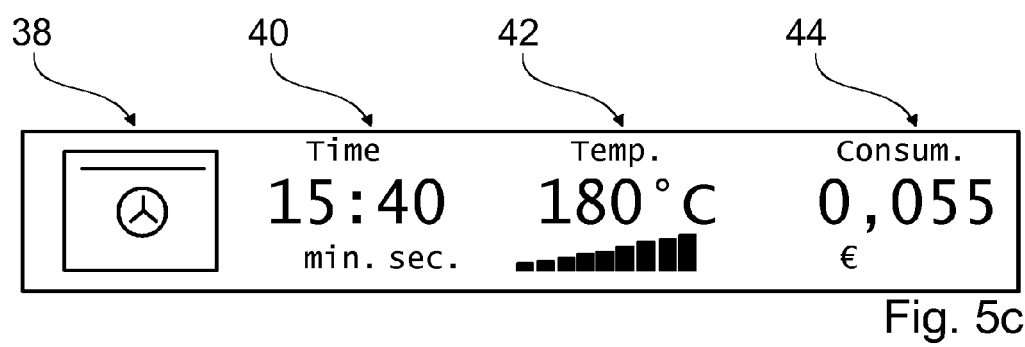
FIG. 5c shows the display of the output unit during a cooking process, with a displayed accumulated consumption in Euros and a cooking time.

Step 52 represents a triggering event in which a user requests a change of display by means of the input unit 18. A check is first made in step 54 as to whether heating units of the oven 26 are in operation. If this is the case, then in a step 56 the evaluating unit 10 calculates a cooking time of a cooking process, as well as an accumulated energy consumption in kWh for the cooking process from tabular values for the heating units of the oven 26 just in operation. The cooking time and the accumulated energy consumption in kWh, along with an operational status of the domestic appliance 12, as well as a setpoint temperature and an actual temperature are transmitted to the output unit 14. FIG. 5b shows a possible display of the display unit of the output unit 14 for this case. The operational display area 38 indicates an operation with recirculated air and top heat. The time display area 40 shows a cooking time of 15 min 40 s. The temperature display area 42 indicates a setpoint temperature of 180° C., as well as an existing actual temperature by means of the bar chart. The consumption display area 44 indicates an accumulated energy consumption of 0.475 kWh for the cooking process. A check is made in step 58 as to whether, within a time interval of 4 s, the user is requesting by means of the input unit 18 a further change of display of the display unit of the output unit 14. If this is not the case, then the display reverts to the initial state of step 50. If within the time interval of 4 s the user requests a change of display by means of the input unit 18, then a check is made in step 60 as to whether the costs in Euros per kWh of electrical energy are stored in the memory unit 16 of the evaluating unit 10. If this is not the case, then the display reverts to the initial state of step 50. If the costs in Euros per kWh of electrical energy are stored in the memory unit 16 of the evaluating unit 14, then in a step 62 the evaluating unit 10 calculates accumulated energy costs in Euros for the cooking process from the accumulated energy consumption in kWh. The accumulated energy costs in Euros are transmitted to the output unit 14. FIG. 5c shows a possible display of the display unit of the output unit 14 for this case. The operational display area 38 indicates an operation with recirculated air and top heat. The time display area 40 indicates a cooking time of 15 min 40 s. The temperature display area 42 indicates a setpoint temperature of 180° C., as well as an existing actual temperature by means of the bar chart. The consumption display area 44 indicates accumulated energy costs of 0.055 Euros for the cooking process. The display reverts to the initial state of step 50 after a time interval of 4 s.

Figure 7A:
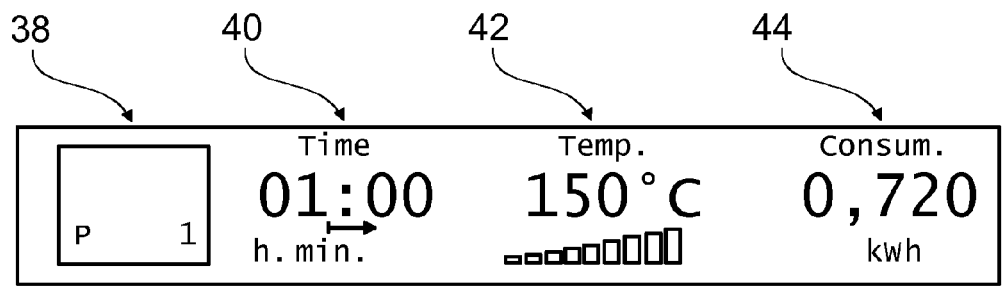
FIG. 7a shows the display of the output unit during selection of a sequence program, with a displayed expected consumption in kWh and a cooking time.
Figure 7B:
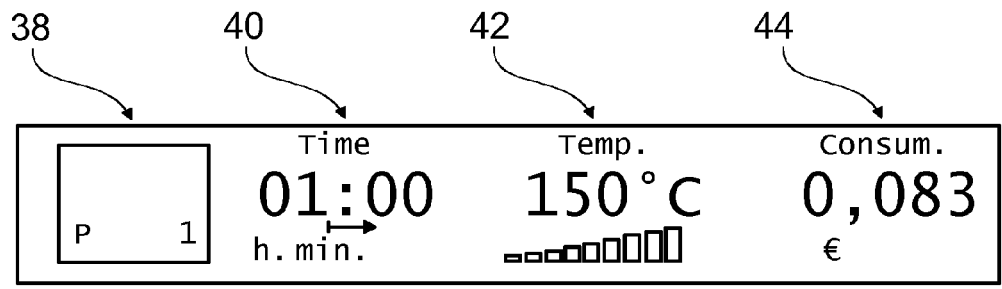
FIG. 7b shows the display of the output unit during selection of the sequence program, with a displayed expected consumption in Euros and a cooking time.

If it happens in step 54 that no heating units of the oven 26 are operating, then a check is made in step 64 as to whether a cooking program has just been selected. If this is the case, then in a step 66 an expected energy consumption in kWh stored in the memory unit 16 for the program just preselected is read by the evaluating unit 10. The stored expected energy consumption represents an average value of the energy consumption for the cooking program just preselected. If an average energy consumption in kWh is not yet stored for the relevant cooking program, then the display of the display unit of the output unit 14 reverts to the initial state of step 50. If an average energy consumption is available for the relevant cooking program then this value, together with operating parameters of the preselected cooking program, is transmitted to the output unit 14. FIG. 7a shows a possible display of the display unit of the output unit 14 for this case. The operational display area 38 indicates that a cooking program has just been selected. The time display area 40 indicates a selected cooking time of 1 h. The temperature display area 42 indicates a setpoint temperature of 150° C., as well as an existing actual temperature by means of the bar chart. The consumption display area 44 indicates an expected energy consumption of 0.720 kWh for the preselected cooking program. A check is made in a step 68 as to whether the user has requested by means of the input unit 18 a change of display of the display unit 14 within a time interval of 4 s. If this is not the case, then the display reverts to the initial state of step 50. If, within the time interval of 4 s, the user requests a change of display by means of the input unit 18, then a check is made in a step 70 as to whether the costs in Euros per kWh of electrical energy are stored in the memory unit 16 of the evaluating unit 10. If this is not the case, then the display reverts to the initial state of step 50. If the costs in Euros per kWh of electrical energy are stored in the memory unit 16 of the evaluating unit 10, then expected energy costs in Euros for the preselected cooking program are calculated in a step 72 from the expected energy consumption in kWh. The expected energy costs in Euros are transmitted to the output unit 14. FIG. 7b shows a possible display of the display unit of the output unit 14 for this case. The operational display area 38 indicates that a cooking program has just been selected. The time display area 40 indicates a selected cooking time of 1 h. The temperature display area 42 indicates a setpoint temperature of 150° C., as well as an existing actual temperature by means of the bar chart. The consumption display area 44 indicates expected energy costs of 0.083 Euros for the preselected cooking program. The display again reverts to the initial state of step 50 after a time interval of 4 s.

Figure 6B:
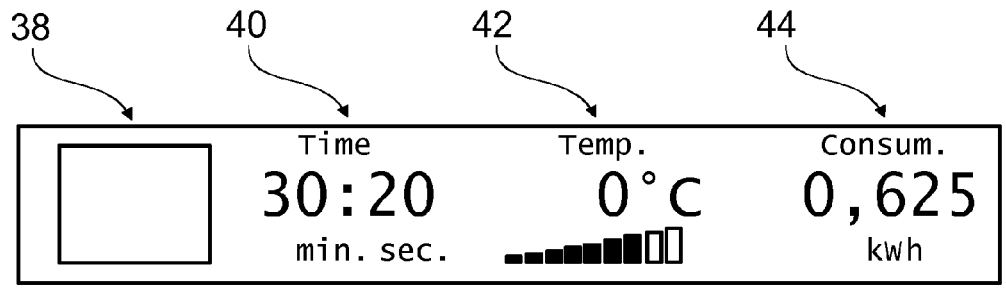
FIG. 6b shows the display of the output unit at the end of a cooking process, with a displayed accumulated consumption in kWh and a cooking time.
Figure 6C:
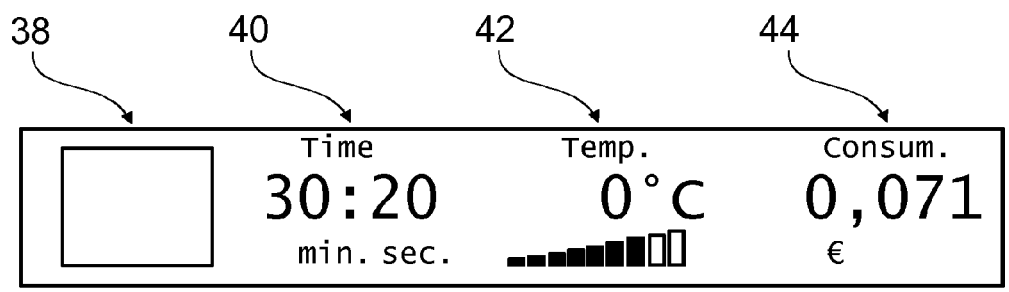
FIG. 6c shows the display of the output unit at the end of a cooking process, with a displayed accumulated consumption in Euros and a cooking time.

If it happens in step 64 that no cooking program has been selected, then the current operational status of the domestic appliance 12 is a stand-by mode with advantageously low energy consumption. A cooking time and an accumulated consumption of the last cooking process are read by the evaluating unit 10 in a step 74. The cooking time and the accumulated consumption of the last cooking process, together with an actual temperature, are transmitted to the output unit 14. FIG. 6b shows a possible display of the display unit of the output unit 14 for this case. The operational display area 38 indicates that the domestic appliance 12 is switched off. The time display area 40 indicates a cooking time 30 min 20 s for the last cooking process. The temperature display area 42 indicates a setpoint temperature of 0° C., as well as an existing actual temperature by means of the bar chart. The consumption display area 44 indicates an accumulated energy consumption of 0.625 kWh for the last cooking process. A check is made in a step 76 as to whether the user has requested by means of the input unit 18 yet another display of the display unit of the output unit 14 within a time interval of 4 s. If this is not the case, then the display reverts to the initial state of step 50. If, within the time interval of 4 s, the user requests by means of the input unit 18 a further display, then a check is made in a step 78 as to whether the costs in Euros per kWh of electrical energy are stored in the memory unit 16 of the evaluating unit 10. If this is not the case, then the display reverts to the initial state of step 50. If the costs in Euros per kWh of electrical energy are stored in the memory unit 16 of the evaluating unit 10, then in a step 80 the evaluating unit 10 calculates accumulated energy costs in Euros for the last cooking process from the accumulated energy consumption in kWh. The accumulated energy costs in Euros are transmitted to the output unit 14. FIG. 6c shows a possible display of the display unit of the output unit 14 for this case. The operational display area 38 indicates that the domestic appliance 12 is switched off. The time display area 40 indicates a cooking time of 30 min 20 s. The temperature display area 42 indicates a setpoint temperature of 0° C., as well as an existing actual temperature by means of the bar chart. The consumption display area 44 indicates accumulated energy costs of 0.071 Euros for the last cooking process. The display again reverts to the initial state of step 50 after a time interval of 4 s.

In an alternate embodiment of the domestic appliance device it would also be conceivable that the evaluating unit 10 could calculate an instantaneous power draw, an accumulated energy consumption and accumulated energy costs of the domestic appliance 12 by means of measured instead of stored values. For this, the evaluating unit 10 can have appropriate measuring elements, in particular current and/or voltage measuring devices. Alternately or additionally, the evaluating unit 10 can specify the costs per kWh of electrical energy in any other currency. For this, instead of the Euro symbol, another appropriate symbol can be provided in the display unit of the output unit 14. Alternately or additionally, it is conceivable that the evaluating unit 10 blocks operation of the domestic appliance 12 depending on the costs in Euros per kWh of electrical energy. An oven 26 could then be created, which only starts a cooking program when the costs in Euros per kWh of electrical energy fall below a predetermined or specifiable limiting value. The result of this can be that the oven 26 then starts a cooking program if the energy costs are low for a cooking process. This is the case at night in particular. Furthermore, alternately or additionally, it is conceivable that the evaluating unit 10 stores in the memory unit 16 an accumulated consumption in each case in accordance with at least two grouping parameters. In this case the grouping parameters can be the names of users. The evaluating unit 10 can therefore store an accumulated total consumption for at least two users in each case. When the domestic appliance 12 starts up, the user selects his user profile and thus receives information concerning his last operating process of the domestic appliance 12 and/or about a total accumulated consumption in a specifiable time period. Furthermore, he receives information about operating costs accrued by him. The specifiable time period can extend for example over a month or over a year. This can considerably simplify billing of the operating costs of the domestic appliance 12 in the case of shared use of the domestic appliance 12 by a plurality of users. Advantageously, the output unit 14 then has an output interface, in particular a USB interface, via which it is possible to download the stored data, in particular in tabular form.

Apart from use in an oven, the inventive domestic appliance device can be used in any other domestic appliance. In washing machines and dishwashers in particular, energy costs as well as water costs can be evaluated in this way. Gas costs in a gas cooker in particular can be evaluated. Furthermore, use in electric cooktops, in particular induction cooktops, and in tumble dryers, is conceivable.

The invention claimed is:

1. A domestic appliance device, comprising:
    an input unit, the input unit being configured to allow a first user of the domestic appliance device to identify at least the first user to the device;
    a memory unit, the memory unit configured to store user-specific information regarding the usage preferences and usage history;
    an evaluating unit which evaluates a consumption of an external resource by the user of a domestic appliance based on a cost-related variable evaluation parameter; and
    an output unit for outputting the evaluated consumption;
    wherein the domestic appliance device is configured to utilize grouping parameters to provide a selectable output comprising (1) total individual user usage, (2) individual user usage during a defined time period, (3) total device usage, and (4) total device usage during a defined time period.

2. The domestic appliance device of claim 1, wherein the external resource is an energy.

3. The domestic appliance device of claim 1, wherein the external resource is a fluid.

4. The domestic appliance device of claim 1, wherein the evaluating unit includes at least one evaluation memory unit, the evaluation memory unit being configured to receive and store a first variable evaluation parameter.

5. The domestic appliance device of claim 4, wherein the evaluating unit stores the variable evaluation parameter in the evaluation memory unit.

6. The domestic appliance device of claim 4, wherein the evaluating unit stores in the memory unit an accumulated consumption of each of two grouping parameters.

7. The domestic appliance device of claim 1, wherein the input unit is configured to allow the first user to input the variable evaluation parameter.

8. The domestic appliance device of claim 1, further comprising a communications unit which determines, via an Internet connection from an energy exchange and/or from a meter of the external resource, the variable evaluation parameter.

9. The domestic appliance device of claim 1, wherein the evaluating unit prevents operation of the domestic appliance based on a user-provided limit of operation based on the variable evaluation parameter.

10. The domestic appliance device of claim 1, wherein the evaluating unit evaluates an expected consumption of the external resource during selection of a sequence program while taking into consideration the variable evaluation parameter.

11. The domestic appliance device of claim 1, further comprising a control unit, said evaluating unit being constructed, at least partially, in one piece with the control unit.

12. The domestic appliance device of claim 1, further comprising an operational status output unit, said output unit being constructed, at least partially, in one piece with the operational status output unit.

13. The domestic appliance of claim 1, wherein the output unit is programmed to output an accumulated or expected cost in currency based on consumption of the external resource.

14. The domestic appliance of claim 1, wherein the output unit is programmed to output an accumulated or expected cost in currency per unit of the external resource.

15. The domestic appliance of claim 1, wherein the output unit is programmed to output a percentage of an available budget.

16. A method for evaluating a consumption of an external resource by a domestic appliance, said method comprising:
    requiring a first user of the domestic appliance to provide an identifier to the domestic appliance prior to use of the domestic appliance;
    evaluating a consumption of an external resource by the domestic appliance in dependence on a variable evaluation parameter obtained from an internet-connection to an energy exchange;

prompting the first user to select one of a plurality of grouping parameters, the grouping parameters determining an output communicated to the first user and comprising (1) total individual user usage, (2) individual user usage during a defined time period, (3) total device usage, and (4) total device usage during a defined time period; and outputting the evaluated consumption as the output associated with one of the grouping parameters.

17. A domestic appliance, comprising;
a domestic appliance device, said domestic appliance device comprising:
an input unit, the input unit being configured to allow a first user of the domestic appliance device to identify the first user to the device;
a memory unit, the memory unit configured to store user-specific information regarding usage preferences and usage history;
an evaluating unit which evaluates a consumption of an external resource by the user of the domestic appliance based on a cost-related variable evaluation parameter; and
an output unit for outputting the evaluated consumption;
wherein the domestic appliance device is configured to utilize grouping parameters to provide a selectable output comprising (1) total individual user usage, (2) individual user usage during a defined time period, (3) total device usage, and (4) total device usage during a defined time period.

18. The domestic appliance of claim 17, constructed in the form of a cooker.

19. The domestic appliance of claim 17, wherein the external resource is an energy.

20. The domestic appliance of claim 17, wherein the external resource is a fluid.

21. The domestic appliance of claim 17, wherein the evaluating unit includes an evaluation memory unit, the evaluation memory unit being configured to receive and store a first variable evaluation parameter.

22. The domestic appliance of claim 21, wherein the evaluating unit stores the variable evaluation parameter in the evaluation memory unit.

23. The domestic appliance of claim 21, wherein the evaluating unit stores in the memory unit an accumulated consumption of each of two grouping parameters.

24. The domestic appliance of claim 17, wherein the input unit is configured to allow the first user to input the variable evaluation parameter.

25. The domestic appliance of claim 17, wherein the domestic appliance device has a communications unit which determines the variable evaluation parameter via an Internet connection or a meter of the external resource.

26. The domestic appliance of claim 17, wherein the evaluating unit prevents operation of the domestic appliance based on a user-provided limit of operation based on the variable evaluation parameter.

27. The domestic appliance of claim 17, wherein the evaluating unit evaluates an expected consumption of the external resource during selection of a sequence program while taking into consideration the variable evaluation parameter.

28. The domestic appliance of claim 17, wherein the domestic appliance device has a control unit, said evaluating unit being constructed, at least partially, in one piece with the control unit.

29. The domestic appliance of claim 17, wherein the domestic appliance device has an operational status output unit, said output unit being constructed, at least partially, in one piece with the operational status output unit.

* * * * *